March 17, 1959  TAKEO NOJIMA  2,878,070

TRUCK AND WHEEL ASSEMBLY

Filed April 12, 1955

INVENTOR:
TAKEO NOJIMA
BY
Richardson, David and Naidon
Att'ys

United States Patent Office 2,878,070
Patented Mar. 17, 1959

2,878,070

TRUCK AND WHEEL ASSEMBLY

Takeo Nojima, Ota-ku, Tokyo, Japan, assignor to Amagasaki Seitetsu Kabushiki Kaisha, Amagasaki City, Hyogo Prefecture, Japan Application April 12, 1955, Serial No. 500,924

Claims priority, application Japan November 20, 1954

4 Claims. (Cl. 301—5)

This invention relates to a new type of truck and wheel devices.

In ordinary cars or trucks, a pair of wheels is supported by an axle which passes through the centers of the wheels. The axle carries directly the loads on the car and also maintains the wheels in vertical planes in order to ensure that the treads of wheels continuously contact the road or rail surfaces. As far as, however, the load carrying capacity is concerned, the axle would never be an essential element of the car, if the wheels themselves could directly carry the car loads.

An object of the invention is to provide car wheel devices which can directly carry the car loads.

Another object of the invention is to provide car wheel devices being devoid of any conventional axle, thus making it possible to lower the car body substantially to the height of the position in which an ordinary axle has heretofore been disposed.

A further object of the invention is to provide car wheel devices with extremely minute frictional resistance in the bearing parts.

The invention will best be understood from the following detailed description thereof with reference to the accompanying drawings, wherein.

Figure 1:
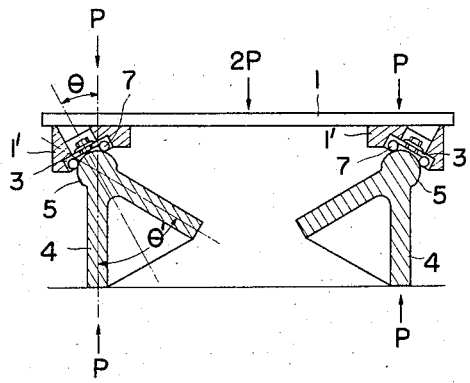
Figure 1 is a view in sectional elevation showing a pair of wheel devices in accordance with the invention as applied to a truck.
Figure 2:
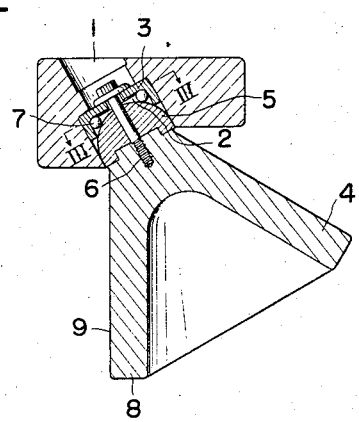
Figure 2 is an enlarged view in sectional elevation of one of the wheel devices shown in Fig. 1.
Figure 3:
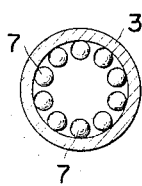
Figure 3 is an enlarged oblique sectional view taken along the line III—III of Fig. 2.

Referring now to the drawings, 1 designates a member of a truck by which a car body, not shown, is to be carried. At the opposite ends of the truck member 1 are disposed bearing blocks 1' fixed to the member 1. Each block 1' is provided with a cylindrical recess 2 open obliquely downwards, with a cylindrical dish-shaped bearing member 3 having a cylindrical flange, with its bottom surface in a plane substantially perpendicular to the cylindrical inside surface of the recess 2. The longitudinal axis of the cylindrical bearing member 3 is disposed at an angle of inclination with respect to the vertical line in the medial plane perpendicular to the direction of travel of the car. I have found that the angle of inclination should preferably amount to approximately 30 degrees. The bearing member 3 is secured in the recess 2 in any suitable manner.

My wheel 4 has a conical configuration with a hemispherical bearing member 5 fixed to the apex portion of the cone at a coaxial position therewith and to the carrying member 3 by means of a screw 6 or the like. The bearing member 5 bears against a series of small spherical balls 7 arranged in a circle within the bearing part 3. The cone angle $\theta'$ of the wheel 4 should be substantially equal to twice the angle of inclination $\theta$ of the longitudinal axis of the recess 2, that is to say, the line of generation 9 of the cone passing through the point of contact of its base or tread rim 8 with the road or rail surface should be substantially vertical, in order to ensure that the line of load force P substantially coincides with the line of generation 9.

The block 1' may be connected to the wheel in a suitable manner, for example, by rigidly connecting the shaft of the screw 6 to the top of the bearing member 5 on the axial line of the conical wheel, which shaft passes through the bearing member 3 and block 1' and is operatively connected to an engine shaft. For trailing wheels, suitable corresponding shaft means, should, of course, be provided for retaining the wheel assembly in position. Such means may also take the form of a coupling around the bearing member 5. It will be understood that two pairs of wheels 4 are provided for an ordinary car.

Experiments have shown that the frictional resistance in the bearing portion is extremely minute, and the car can be driven by the minimum of power consumption. In addition, the wheels do not extend upwards beyond the bearings, and the car body can be positioned as low as the position of the shaft of ordinary wheels.

It will readily be understood that the invention may also be applied to cultivation machines by providing spade or plough blades on the rim 8 of the wheel. It will also be appreciated that suitable tyres, including pneumatic tyres, may be attached to the rim 8. When the wheels are to run on along rails, suitable flanges should be provided on the rims 8.

I claim as my invention:

1. A truck and wheel assembly comprising a frame, a bearing block secured thereto, a cylindrical recess open obliquely downwards in said bearing block, a cylindrical dish-shaped bearing member in the bottom of each recess, a plurality of spherical balls within each bearing member, arranged in a circle and bearing against both the bottom and the cylindrical inside surfaces of said dish-shaped bearing member, a conical wheel having its tread on the base rim of the cone and having a hemispherical bearing member at the apex portion of said conical wheel extending into said bearing member to bear against said circle of balls, the angle of inclination of said cylindrical bearing member being acute and the cone angle of said wheel being such that the line of generation of the cone of the wheel passing through the lowest point of the base rim of the wheel is substantially vertical and means for securing the wheel and hemispherical bearing member to the dish-shaped bearing member.

2. A device as claimed in claim 1, in which said angle of inclination is about 30 degrees.

3. A truck and wheel assembly comprising a frame, a pair of bearing blocks secured thereto, each of said blocks being provided with a cylindrical recess open obliquely downwards in said bearing block, a cylindrical dish-shaped bearing member in the bottom of each recess, a plurality of spherical balls within each bearing member arranged in a circle and bearing against both the bottom and the cylindrical inside surfaces of said bearing member, a conical wheel having its tread on the base rim of the cone and having a hemispherical bearing member at the apex portion of said conical wheel extending into each dish-shaped bearing member to bear against said circle of balls, the angle of inclination of said cylindrical recess being about 30 degrees and the cone angle of said wheel being such that the line of generation of the cone of the wheel passing through the lowest point of the base rim of the wheel is substantially vertical, the obliquely disposed cylindrical recesses in both said bearing blocks being arranged to converge with respect to each other, the angle of inclination of each bearing member being the same, and means for securing the wheel and hemispherical bearing member to the dish-shaped bearing member.

4. A truck and wheel assembly comprising a frame, a plurality of pairs of bearing blocks secured thereto, the blocks of each pair being disposed on opposite sides of said frame, each of said blocks being provided with a cylindrical recess open obliquely downwards in said bearing block, a cylindrical dish-shaped bearing member in the bottom of each recess, a plurality of spherical balls within each bearing member arranged in a circle and bearing against both the bottom and the cylindrical inside surfaces of said bearing member, a conical wheel having its tread on the base rim of the cone and having a hemispherical bearing member at the apex portion of said conical wheel extending into said dish-shaped bearing member to bear against said circle of balls, the angle of inclination of said cylindrical recess being about 30 degrees and the cone angle of said wheel being such that the line of generation of the cone of the wheel passing through the lowest point of the base rim of the wheel is substantially vertical, the obliquely disposed cylindrical recesses in each pair of blocks being arranged to converge with respect to each other, the angle of inclination of each bearing member being the same, and means for securing the wheel and hemispherical bearing member to the dish-shaped member.

References Cited in the file of this patent

UNITED STATES PATENTS

| | | |
|---|---|---|
| 191,286 | Humphrey | May 29, 1877 |
| 851,396 | Bode | Apr. 23, 1907 |

FOREIGN PATENTS

| | | |
|---|---|---|
| 710,525 | Great Britain | June 16, 1954 |